United States Patent [19]

Newman

[11] Patent Number: 5,663,525

[45] Date of Patent: Sep. 2, 1997

[54] ELECTRICAL METER BOX FOR SERVICE LATERAL AND METHOD OF USING SAME

[76] Inventor: James R. Newman, 418 Banner Ave., Winston-Salem, N.C. 27127

[21] Appl. No.: 406,530

[22] Filed: Mar. 20, 1995

[51] Int. Cl.⁶ .................................. H02G 3/08; H02G 3/18
[52] U.S. Cl. ............................ 174/50; 174/65 R; 220/3.8
[58] Field of Search .................. 220/3.8, 3.5; 52/220.3, 52/220.4; 174/65 R, 17 R, 19, 50, 51, 60; 29/745, 742

[56] References Cited

U.S. PATENT DOCUMENTS

| | | | |
|---|---|---|---|
| 3,009,128 | 11/1961 | De Carlo | 174/51 |
| 3,028,990 | 4/1962 | Maier . | |
| 3,361,938 | 1/1968 | Watson | 174/38 |
| 3,584,136 | 6/1971 | Robert | 174/53 |
| 3,895,179 | 7/1975 | Wyatt . | |
| 4,025,825 | 5/1977 | Shrader | 361/374 |
| 4,785,140 | 11/1988 | Adams et al. | 174/50 |
| 5,011,033 | 4/1991 | Roth . | |
| 5,066,832 | 11/1991 | Clarey et al. | 174/65 R |
| 5,272,279 | 12/1993 | Filshie | 174/50 |
| 5,280,132 | 1/1994 | Clarey et al. . | |
| 5,304,736 | 4/1994 | Halfacre | 174/48 |

*Primary Examiner*—Kristine L. Kincaid
*Assistant Examiner*—Dhiru Patel
*Attorney, Agent, or Firm*—Wigman, Cohen, Leitner & Myers, P.C.

[57] ABSTRACT

A method of and a meter box apparatus for connecting a electrical service lateral to a misaligned meter box mounted on the exterior of a building structure such as a residence are disclosed. The meter box apparatus comprises a rectangular box-like enclosure with a removable bottom panel having a knock-out which can be placed over the misaligned service lateral and affixed to a conduit carrying the service lateral. The bottom panel is then urged into position in the meter box by flexing the conduit and is fastened in place to provide a neat, professional-looking connection.

8 Claims, 2 Drawing Sheets

ELECTRICAL METER BOX FOR SERVICE LATERAL AND METHOD OF USING SAME

FIELD OF THE INVENTION

The present invention relates to electrical power equipment and more particularly to electric meter boxes especially for residential electric service and a method of connecting an electrical underground service lateral to an electric meter box.

DESCRIPTION OF THE PRIOR ART

Providing electrical service to new construction, especially to new residential construction, usually involves laying an underground electrical cable, known as a service lateral, up to a point adjacent the residence or the concrete footing of the residence. The service lateral is then brought to the surface usually in a plastic conduit or pipe next to the residential structure for subsequent connection to the electrical service box or meter box by a local power company.

Conventional meter boxes are made of relative heavy sheet metal bent to form a rectangular box open on one side with a plurality of knockouts in at least one of the panels of the box. A cover panel with an opening to receive an electric meter is then secured over the open side of the box to enclose the electrical meter components.

The electrical contractor responsible for the interior electrical installation of the residence will usually mount the electrical meter box to which all the residence wiring circuits are connected on a wall of the residence in the vicinity of the underground service lateral. More often than not, the meter box and the service lateral are not properly aligned to facilitate connection of the service lateral to the meter box by power company personnel. Frequently, such misalignment necessitates additional excavation, including possibly breaking up and repouring concrete around the service lateral, to reposition it. Alternatively, this problem is sometimes solved by forming an awkward and unsightly multiple bend in the electrical service cable to align the cable with the meter box and lead it into the box through a knock-out in the box, typically in the fixed bottom panel of the meter box.

It is known to construct interiorly mounted electrical boxes or enclosures, e.g., for circuit breakers, junctions, outlet boxes and the like, with removable or tiltable panels or of multiple panel components. Examples of such interior electrical boxes are disclosed in U.S. Pat. Nos. 3,584,136; 5,011,033; and 5,280,136. However, it would be desirable to provide an exteriorly mounted meter box with a removable bottom panel which facilitates the process of connecting a misaligned service lateral to the meter box without the need for excavation of soil or concrete or unsightly multiple bends in the electrical service cable leading to the meter box.

SUMMARY OF THE INVENTION

In view of the foregoing limitations and shortcomings of the prior art methods and devices, as well as other disadvantages not specifically mentioned above, it should be apparent that there still exists a need in the art for a method of and an electrical meter box apparatus for facilitating the connection by a power company of a misaligned service lateral cable with the meter box without the need for excavation or sharp, multiple bends in the cable. It is, therefore, a primary objective of this invention to fulfill that need by providing an electrical meter box with a completely removable bottom panel suitable for removal from the meter box and attachment to the service lateral.

It is also an objective of the invention to provide a method of connecting an underground service lateral cable to a meter box when the two are misaligned while at the same time avoiding the need for excavation around the service lateral or multiple bending of the service lateral cable.

Briefly described, the aforementioned objectives are accomplished according to the invention by providing a meter box with a removable bottom panel adapted to be removed and fitted to a conduit carrying the electrical service cable. The conduit is cut to the proper length and the panel is secured to the conduit so that, by deflecting the conduit, the bottom panel can be aligned in proper position with the meter box and bolted in place. This eliminates the need to perform an excavation or concrete removal from the location where the service lateral extends upwardly through the surface of the ground from the underground cable run. The process of the invention is sufficiently flexible to accommodate many different types of service lateral arrangements used with respect to construction footings as well as other misalignment problems between the meter box and service lateral.

With the foregoing and other objects, advantages and features of the invention that will become hereinafter apparent, the nature of the invention may be more clearly understood by reference to the following detailed description of the invention, the appended claims and to the several views illustrated in the drawings.

DETAILED DESCRIPTION OF THE INVENTION

Figure 1:
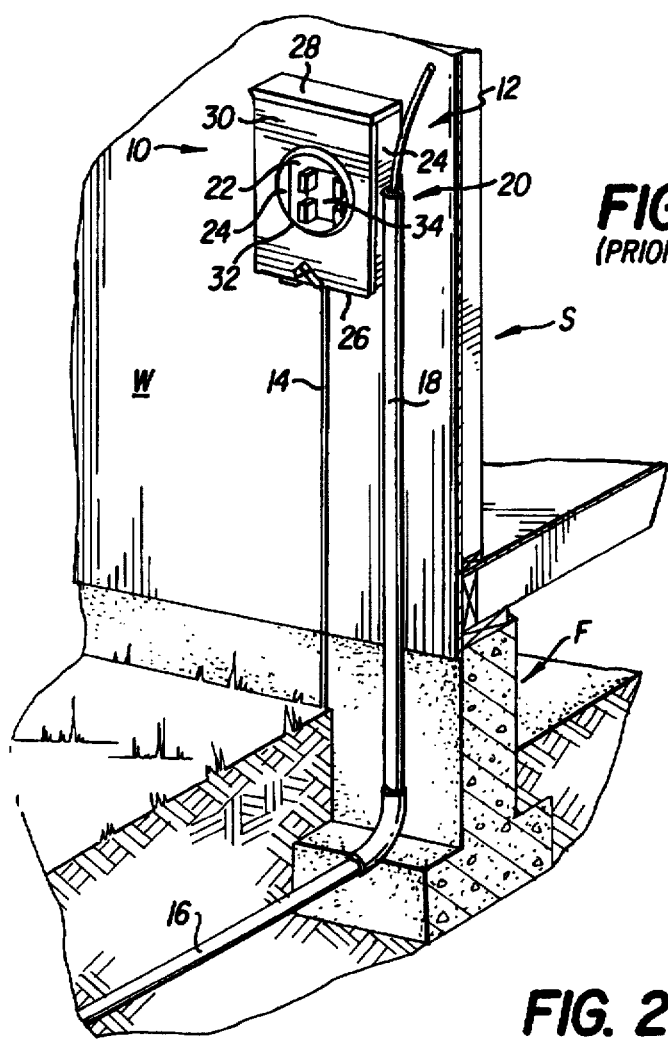
FIG. 1 is a perspective view partly in cross-section, showing a typical, prior art misalignment between an exterior electrical meter box and an underground service lateral.

Referring now in detail to the drawings, there is shown in the perspective view of FIG. 1 a typical arrangement of an electrical meter box 10 and an electrical service lateral 12 as it appears to power company personnel whose task it is to connect the service lateral to the meter box electrical connections. The meter box 10 has been mounted to the exterior wall W of a building structure S, such as a residence. The meter box 10 is ordinarily grounded by means of a copper conductor 14 of 4 or 6 gauge. The service lateral 12 is usually routed to the vicinity of the footing F of building structure S via an underground conduit 16 which may be connected in various ways at or adjacent the footing F to a vertically extending conduit section 18. Typically, the conduits 16, 18 are made of a polymeric material, such as HDPE or the like.

In a conventional or typical construction shown in FIG. 1, meter box 10 comprises a sheet metal box formed in three pieces, namely, (1) a four-sided rectangular base 20 comprising a back panel 22, two side panels 24 and a bottom panel 26; (2) a top panel 28; and (3) a front panel 30 having a circular opening 32 therein through which an electric meter (not shown) extends. The electrical connectors 34 for the meter and the service cables are mounted to the back panel 22.

The building service cable (not shown) is connected to the meter electrical connector 34 so that the service lateral 12 must be passed through the meter box 10 and connected to the meter connector 34 to supply metered electrical power to the residence. Conventionally, the bottom panel 26 of the meter box base 20 is provided with one or more knock-outs (not shown) through which the service lateral 12 is usually passed for connection to the meter connector 34.

As is apparent from FIG. 1, the vertical conduit 18 carrying the service lateral 12 is misaligned with the bottom panel 26 of the meter box 10. Occasionally, this misalignment is more pronounced than that shown in FIG. 1 making it virtually impossible to make a neat and professional-looking connection between the service lateral and the meter box. In some cases, the vertical conduit section 18 is cut off below the level of the bottom panel 26 and the service lateral is bent over and passed up through a knock-out in the bottom panel for connection. In other cases, the contractor will excavate the underground conduit 16 and reposition it to another location beneath the meter box 10 so that vertical conduit section 18 is aligned with a knock-out in the bottom panel 26.

Figure 2:
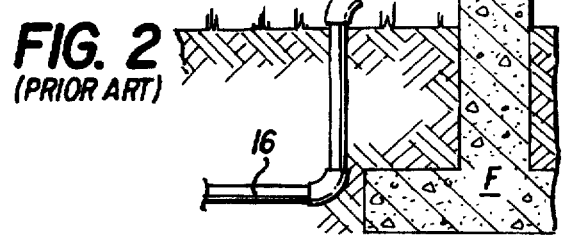
FIGS. 2–4 are side elevation views, partly in cross-section, showing other prior art arrangements of a misaligned service lateral that can be accommodated by the present invention.
Figure 3:
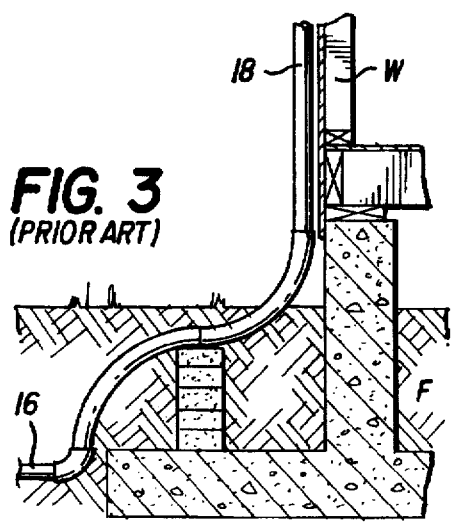
Figure 4:
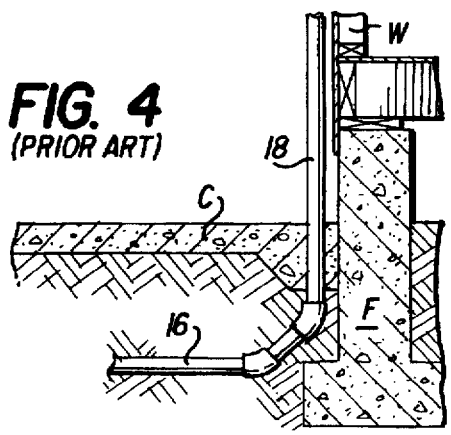

FIGS. 2-4 show other possible arrangements of the connection between the underground conduit 16 and the vertical conduit section 18 which carry the service lateral 12. FIGS. 2 and 3 illustrate arrangements wherein the building footing F extends a substantial distance away from the building wall W so as to require a variety of conduit connections between the two conduits 16, 18. FIG. 4 illustrates an arrangement similar to FIG. 1 except that a concrete slab C has been poured adjacent the building structure so that the vertical conduit section 18 may be rigidly fixed in a misaligned position relative to the meter box. In such case, the contractor may have to break up the concrete slab C and excavate beneath it in order to properly align the service lateral 12 and conduit 18 with the meter box 10.

Figure 5:
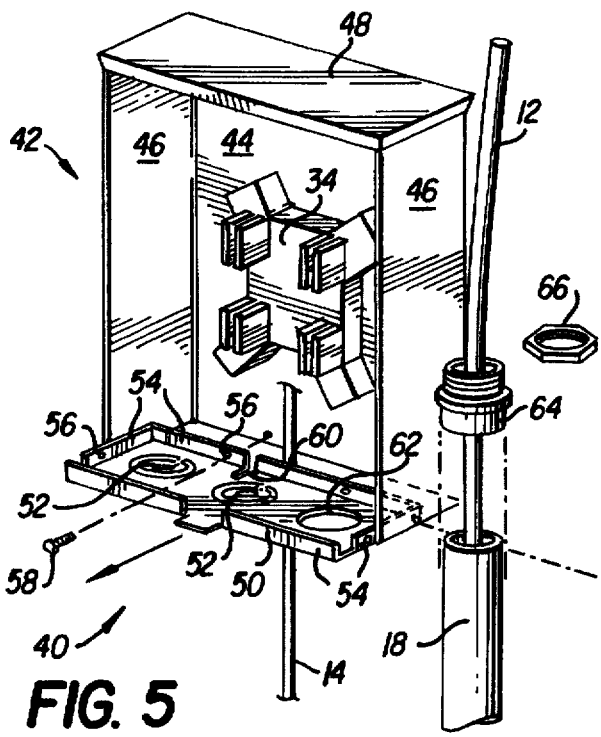
FIG. 5 is an exploded perspective view of an electric meter box embodying the present invention.
Figure 6:
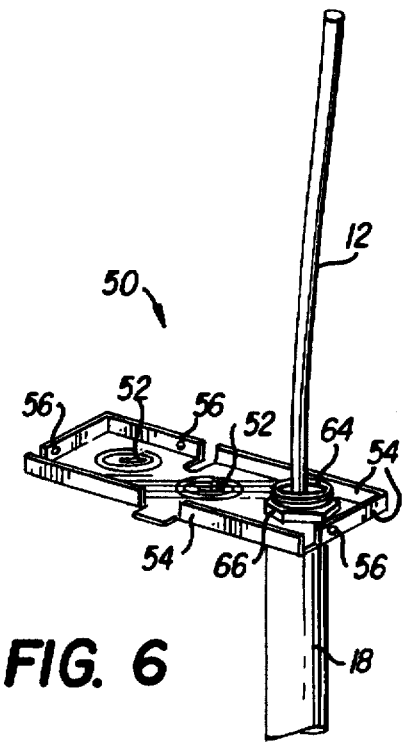
FIG. 6 is a perspective view showing the removable bottom panel of the meter box of FIG. 5 fitted to the conduit of the service lateral.
Figure 7:
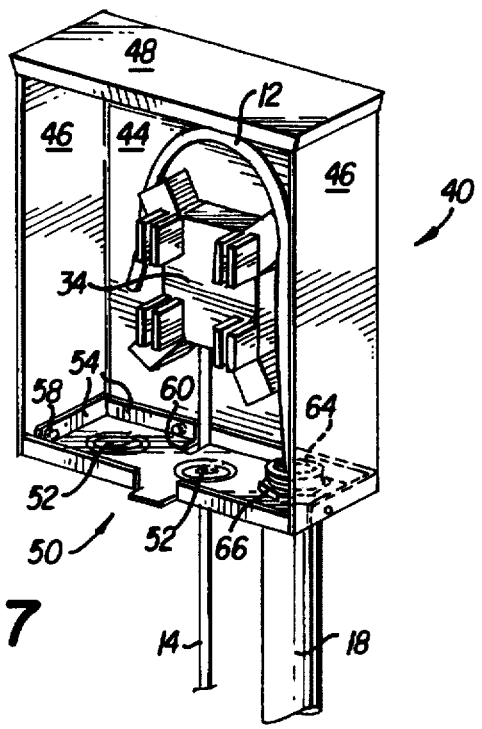
FIG. 7 is a perspective view showing the service lateral connected to the electric meter box according to the invention.

Referring now to FIGS. 5-7, the electric meter box construction of the present invention is shown, together with the method of using the meter box to connect a misaligned service lateral. FIG. 5 is an exploded perspective view illustrating the meter box 40 of the present invention which comprises a four-piece rectangular box-like structure made of sheet metal. The first piece or base 42 comprises a back panel 44 and two side panels 46; the second piece comprises a top panel 48 identical to top panel 28 of the prior art construction shown in FIG. 1; the third piece comprises a front panel (not shown) which is identical to the front panel 30 of the prior art construction shown in FIG. 1; and the fourth piece is a removable bottom panel 50 with a plurality of knock-outs 52. Bottom panel 50 is formed with a plurality of upstanding flanges 54 about its perimeter. Flanges 54 are provided with holes 56 through which threaded fasteners, such as self-tapping screws 58, are used to secure the bottom panel 50 to the back panel 44 and side panels 46 of the base 42. A slot 60 is provided in the rear edge of bottom panel 50 for receiving a ground wire 14.

To connect the service lateral 12 to the meter box 40 of the invention from its position in the misaligned conduit 18, the conduit 18 is cut off at a height substantially flush with the bottom of the meter box 40 as shown in FIG. 5. One of the knock-outs 52 is removed to provide an opening 62 for the service lateral. A conventional threaded pipe coupling 64 is threaded onto the service lateral cable 12 and fitted onto the upper cut-off end of conduit 18. The opening 62 in bottom panel 50 is then placed over the service lateral 12 and over the threads of pipe coupling 64. A lock nut 66 is then placed over the service lateral 12 and threaded loosely onto the threads of coupling 64 as shown in FIG. 6.

After that step is completed, the bottom panel 50 is relocated in position in the bottom of the base 42 of the meter box 40 by flexing the plastic conduit 18 as necessary. When the bottom panel 50 is properly positioned, screws 58 are used to fasten bottom panel 50 to the base 42 making sure the ground wire 14 fits into slot 60 as shown in FIG. 7. After the bottom panel 50 is securely fastened to the meter box 40, the locking nut 66 is threaded tightly onto coupling 64 so that the conduit 18 is securely fastened to the bottom panel 50. Thereafter, the service lateral 12 may be connected as appropriate to the meter box connections 34 by power company personnel and the meter box cover panel and electric meter may be mounted to meter box 40.

It will be appreciated by those skilled in the art that it would not be possible to make the neat connection shown in FIG. 7 without the removable bottom panel 50 or without either removing and remounting the entire meter box 40 or excavating and relocating the service lateral conduits 16, 18 into an aligned position. Not only does the present invention make possible a proper service lateral connection to a misaligned meter box, it also facilitates secure attachment of the coupling 64 and lock nut 66 to the meter box 40, as well as facilitates connecting the ground wire 14 to the connections 34.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

I claim:

1. A method of connecting an underground electrical service lateral carried by an upstanding conduit to a meter box enclosure to be mounted exteriorly of a building in a position misaligned with respect to the position of the conduit carrying the service lateral, comprising the steps of:

providing a removable bottom panel separate from said meter box enclosure and having at least one knock-out therein;

mounting said meter box enclosure exteriorly of said building in said position misaligned with respect to the position of the conduit;

cutting off an upstanding end of the conduit at a level substantially flush with the bottom of the meter box enclosure;

mounting a coupling to the cut-off end of the upstanding conduit;

removing the knock-out from the bottom panel to create an aperture therein;

positioning the aperture over the coupling;

securing the coupling to the bottom panel;

flexing the upstanding conduit so as to position the bottom panel in place in the bottom of the meter box enclosure; and fastening the bottom panel substantially horizontally to the bottom of meter box enclosure.

2. The method of claim 1, wherein said coupling is a threaded coupling, said securing step including loosely threading a lock nut onto the threaded coupling and, after said fastening step, tightly threading said lock nut onto the threaded coupling.

3. The method of claim 1, wherein said fastening step includes the steps of sliding the bottom panel into the bottom of the meter box enclosure and fastening the bottom panel to sides and a rear of the meter box enclosure with self-tapping screws.

4. The method of claim 1, including the step of, prior to fastening the bottom panel to the bottom of the meter box enclosure, extending a ground wire into the meter box enclosure from the bottom thereof.

5. A meter box enclosure for mounting on an exterior of a building, said meter box enclosure comprising a rectangular box having a back panel, two side panels, a top panel, a bottom panel and a front panel, said front panel including an opening through which a meter extends, said bottom panel being formed as a separate piece having a perimeter and being removably affixed to the back and side panels, said bottom panel having at least one knock-out;

wherein said bottom panel has upstanding flanges disposed along the perimeter thereof, a plurality of holes in said flanges, and fastener means extending through said holes for fastening the bottom panel to both the back and side panels of the rectangular box;

whereby said bottom panel is completely separable and removable from said rectangular box for connection of a conduit to said bottom panel, and said bottom panel is easily slidable into and mountable to said back and side panels once said conduit is connected thereto.

6. The meter box enclosure of claim 5, including a slot in the perimeter of said bottom panel for receiving a ground wire extending into the meter box enclosure.

7. The meter box enclosure of claim 5, wherein the back and side panels are formed in one piece and the top, bottom and front panels are each formed in one piece separately from the other pieces.

8. The meter box enclosure of claim 5, wherein the meter box enclosure is made of sheet metal.

* * * * *